J. W. ALTICK.
GREASE CUP.
APPLICATION FILED NOV. 20, 1911.

1,032,318.

Patented July 9, 1912.

Witnesses
W. Siebler
C. Borghardt

Inventor
James W. Altick.

By R. J. McCarty
his Attorney

COLUMBIA PLANOGRAPH CO., WASHINGTON, D. C.

UNITED STATES PATENT OFFICE.

JAMES W. ALTICK, OF DAYTON, OHIO, ASSIGNOR OF ONE-HALF TO WILLIAM T. WUICHET, OF DAYTON, OHIO.

GREASE-CUP.

1,032,318. Specification of Letters Patent. Patented July 9, 1912.

Application filed November 20, 1911. Serial No. 661,427.

*To all whom it may concern:*

Be it known that I, JAMES W. ALTICK, a citizen of the United States, residing at Dayton, in the county of Montgomery and State of Ohio, have invented certain new and useful Improvements in Grease-Cups; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in lubricating grease cups, and is adapted to be used in locations where the grease may be subjected to the action of centrifugal force.

The object of the invention is to provide a lubricator from which the grease is fed only when the machine is in operation, and which feed ceases when the part to be lubricated is stopped.

Figure 1:
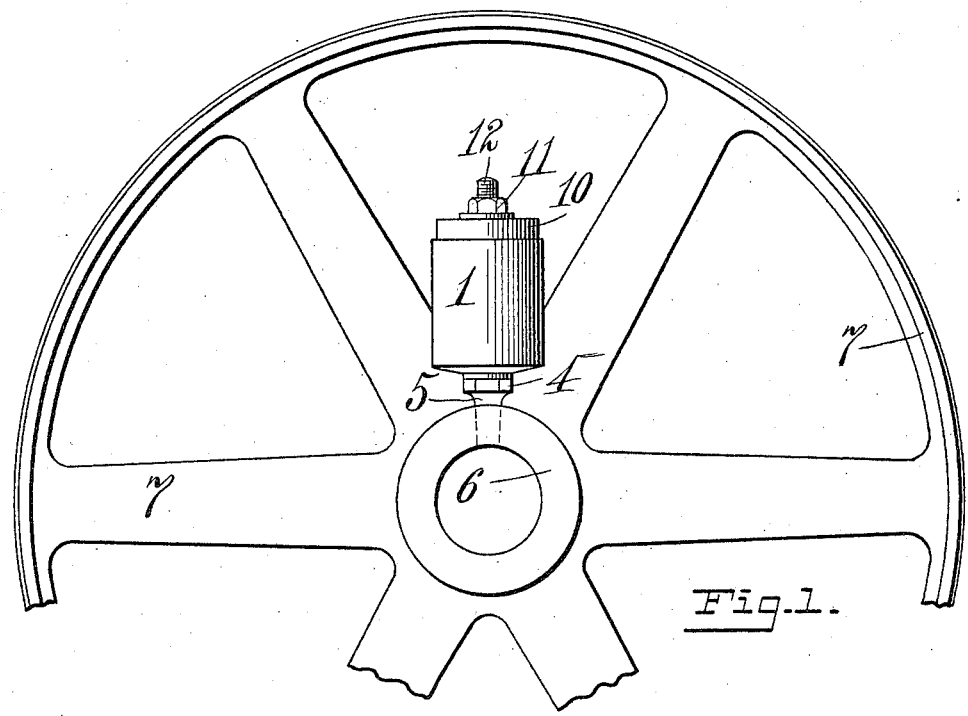
Figures 2, 3:
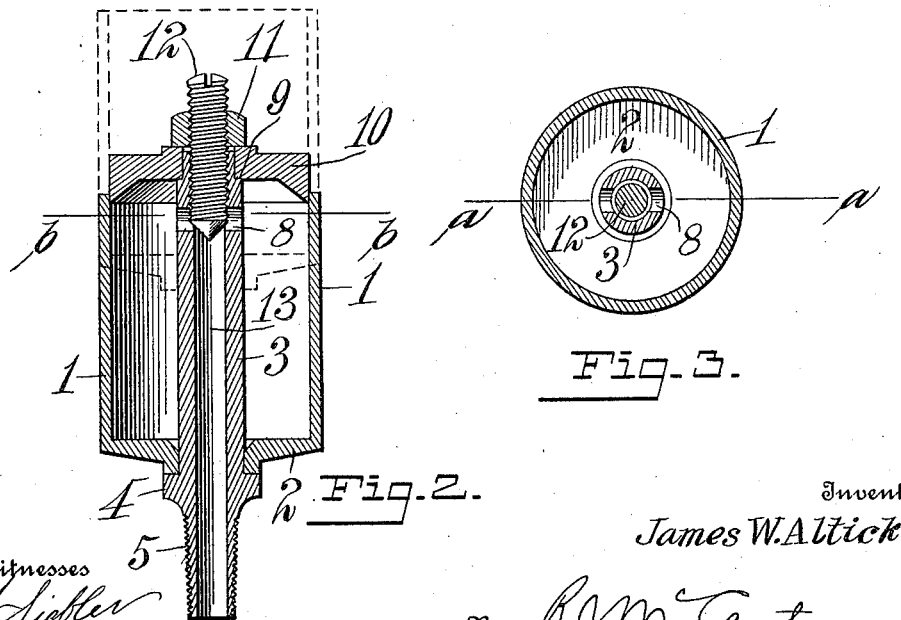

Referring to the accompanying drawings; Figure 1 is a side elevation of my improved grease cup, the same being shown applied to a free running pulley; Fig. 2 is a longitudinal sectional elevation through the cup on the line *a a* of Fig. 3; and Fig. 3 is a section on the line *b b* of Fig. 2.

Referring more particularly to the drawings, 1 represents the cup proper, the bottom 2 of which is provided with an axial opening which receives a hollow stem 3. The stem 3 is provided with a fixed nut portion 4, and a threaded end 5 which may be inserted in an opening in the hub 6, of a pulley 7, and which communicates with the journal of the pulley. The outer end of the stem 3 is provided with lateral side openings 8 which form a communication between the stem and the interior of the grease cup 1. The same end of said stem is provided with a shoulder 9 beyond the parts 8 which receives a piston 10 around which the cup 1 is adapted to reciprocate under the action of centrifugal force. The piston 10 is attached to the stem 3 and held against the shoulder 9 by a nut 11, and a set screw 12 which extends into the central opening 13 of the hollow stem. The set screw 12 is adapted to be inserted within the opening 13 a distance sufficient to cover and partially uncover the openings 8, thus controlling the passage between the grease cup and the stem.

The grease is placed within the cup 1 by removing the piston 10, which acts as a cover, and when the member or pulley 7 is rotated, the centrifugal force thereby generated, will drive the cup outwardly, thereby forcing the grease within said cup through the openings 8 and 13 to lubricate the journal of the rotating member upon which the device is used. The rate at which the grease is fed to the journal may be adjusted by the set screw 12 which is locked in position by the nut 11.

It will be seen that a grease cup as thus constructed is of simple construction and will be efficient in operation, as no lubricant is fed when not needed.

A device of this kind may be used for lubricating loose pulleys, loose gears, clutch pulleys, wrist pins of center crank engines, or any piece of machinery where centrifugal force is available.

I claim:

1. In a device of the type specified, the combination of a tubular stem having lateral openings therein; a cup freely mounted on said stem; a piston mounted on said stem and received by said cup; a regulating plug mounted in the end of said stem and controlling the lateral openings; and means mounted on said plug and holding said piston on said stem.

2. In a lubricating device, the combination of a tubular stem having lateral ports near its outer end and a shoulder beyond said ports, a piston mounted on the end of said stem, a clamping member engaging the outer side of said piston, a regulating plug penetrating said clamping member and said stem and serving to rigidly hold the piston in position and to control the lateral ports in said stem, a cup loosely supported on said stem and adapted to receive the piston, and means limiting the inward position of said cup on the stem.

In testimony whereof I affix my signature, in presence of two witnesses.

JAMES W. ALTICK.

Witnesses:
R. J. McCARTY,
MATTHEW SIEBLER.

Copies of this patent may be obtained for five cents each, by addressing the "Commissioner of Patents, Washington, D. C."